United States Patent
Robles

(10) Patent No.: US 7,959,800 B2
(45) Date of Patent: *Jun. 14, 2011

(54) METHOD FOR PREPARING ACIDIC SOLUTIONS OF ACTIVATED SILICA FOR WATER TREATMENT

(76) Inventor: Antonio T. Robles, Hamilton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/690,137

(22) Filed: Jan. 20, 2010

(65) Prior Publication Data

US 2010/0155643 A1 Jun. 24, 2010

Related U.S. Application Data

(63) Continuation-in-part of application No. 11/262,723, filed on Nov. 1, 2005, now Pat. No. 7,674,374.

(51) Int. Cl.
*C02F 1/52* (2006.01)

(52) U.S. Cl. .......... 210/175; 210/716; 423/335; 516/79

(58) Field of Classification Search .................. 210/716
See application file for complete search history.

(56) References Cited

U.S. PATENT DOCUMENTS

| | | | | |
|---|---|---|---|---|
| 2,378,323 | A * | 6/1945 | Pomeroy | 516/140 |
| 2,645,463 | A * | 7/1953 | Stearns | 366/158.5 |
| 2,769,785 | A * | 11/1956 | Walker | 422/129 |
| 3,635,444 | A * | 1/1972 | Potter | 366/339 |
| 3,963,640 | A * | 6/1976 | Smith | 516/79 |
| 4,673,296 | A * | 6/1987 | Sjogren | 366/159.1 |
| 5,648,055 | A * | 7/1997 | Moffett et al. | 516/79 |
| 5,980,836 | A * | 11/1999 | Moffett et al. | 422/129 |
| 7,281,844 | B2 * | 10/2007 | Glanville | 366/340 |
| 7,338,617 | B2 * | 3/2008 | Koga et al. | 252/179 |
| 7,674,374 | B2 * | 3/2010 | Robles | 210/175 |
| 7,674,833 | B2 * | 3/2010 | Greenwood et al. | 516/82 |
| 2007/0095761 | A1 * | 5/2007 | Robles | 210/723 |

* cited by examiner

*Primary Examiner* — Peter A Hruskoci
(74) *Attorney, Agent, or Firm* — Maier & Maier, PLLC

(57) ABSTRACT

A process is disclosed for the production of acidic solutions of activated silica for water treatment. Activated silica is formed during the process of acidifying a sodium silicate solution to below pH 2 with sulfuric acid.

9 Claims, 2 Drawing Sheets

Activated Silica Preparation Diagram

Figure 1. Activated Silica Preparation Diagram

METHOD FOR PREPARING ACIDIC SOLUTIONS OF ACTIVATED SILICA FOR WATER TREATMENT

RELATED APPLICATIONS

The present invention is a continuation-in-part and claims priority under 35 U.S.C. §120 to U.S. patent application Ser. No. 11/262,723, filed on Nov. 1, 2005, now U.S. Pat. No. 7,674,374, the disclosure of which is incorporated by reference herein in its entirety.

BACKGROUND

Colloidal particles are removed using coagulating chemicals, such as, alum and ferric salts. The chemical coagulants neutralize the electrical charges of the particles that cause them to clump together. These coagulants form metal hydroxides that can absorb on particles together to form a floc.

Flocculation is the agglomeration of destabilized particles into microfloc, and later into bulky floccules that can be settled called floc. The introduction of another reagent, called a flocculant or a coagulant aid may promote the formation of the floc. The flocculation process provides contact between particles to promote their gathering together into a floc and removal by sedimentation and filtration.

Inorganic polymers (activated silica) and natural polymers (starches, alginate) were the first flocculant to be used. Later synthetic polymers became popular due to ease of use.

Activated silica (AS) was the first flocculant used in water treatment. It gives good results, especially when used together with alum in cold water. It is generally added after the coagulant and is prepared immediately before use by partially neutralizing the alkalinity of a solution of sodium silicate. Activated silica is prepared in alkaline conditions [1].

When producing activated silica, it is necessary to consider a large number of parameters affecting the characteristics of the final product, such as the activating agent, the concentration of various reactants, pH, reaction time and temperature, and the way the reagents are mixed [2]. Attempts have long been made to isolate the various chemical reactions involved in the formation of activated silica and their effect on the final product. Baylis, J. R, U.S. Pat. No. 2,217,466, for instance, discloses forming activated silica by partial neutralization of alkali metal silicate by the addition of a N/50 of sulfuric acid to a 1 to 3 percent silicate solution. The aging concentration of silica in the mixture is about 1.5% and the final concentration before use is 1% by dilution with water. About 85% of the sodium silicate in the batch preparation is neutralized by the acid and requires an aging time of about one hour before use. This method of making activated silica is difficult to accomplish due to gelling and long aging time. This method suffers from the disadvantage that the making of the activated silica requires close control of alkalinity for best results.

Schworm et al., U.S. Pat. No. 2,234,285, tried to use sulfate salts, such as aluminum and iron sulfates instead of sulfuric acid to partially neutralize sodium silicate. The mixture is added into the water without aging the activated silica. Baker et al., U.S. Pat. No. 2,310,009 improved the use of metal salts by aging the activated silica to incipient gel formation and then diluting it with water to stabilize the activated silica. This method suffers from the disadvantage that the making of the activated silica requires higher reagent cost.

Hay et al., U.S. Pat. No. 2,444,774, tried to use ammonium sulfate to make activated silica with the advantage that the product is not prone to gelling. This may be advantageous to water treatment plants that use chloramines as the primary disinfectant. This method suffers from the disadvantages of expensive reagents and ammonia added to the water may not be wanted in the finish product.

Walker, J. D., U.S. Pat. No. 2,769,785, tried to use chlorine to make activated silica that lends to continuous type of operation. This method suffers from the disadvantages of complex apparatus and control of the activated silica making process. This process is complicated to implement.

Elston, J. W., U.S. Pat. No. 2,466,842, Mahler, W., U.S. Pat. No. 4,213,950, and Arika et al., U.S. Pat. No. 4,554,211, demonstrated the production of silica gel that is unsuitable as a flocculant in the water treatment process.

Rushmere U.S. Pat. No. 4,954,220 and U.S. Pat. No. 5,176,891 showed the benefits of using different activating agents for the production of activated silica use in papermaking retention and drainage.

Moffett et al., U.S. Pat. No. 5,980,836, No. 5,853,616, and No. 5,648,055 showed the preparation of polyaluminosilicate microgels by using an activator such as alumina, alkali metal aluminate, and other aluminum salts which are more expensive than the sulfuric acid used in this invention to make the activated silica. The product polyaluminosilicate microgels is unstable and not suitable for the removal of natural organic matter (NOM) in water.

Haase et al., U.S. Pat. No. 5,069,893 showed the preparation of a polymeric basic aluminum silicate-sulfate used for turbidity removal in water treatment.

Lind et al., U.S. Pat. No. 5,573,674 showed the preparation of an activated sol using sodium aluminum sulfate as the activating agent. The sol is prepared in a basic condition.

The most common activating agents are: sulfuric acid, alum, chlorine, sodium bicarbonate, carbon dioxide, aluminum sulfate, sodium aluminum sulfate, and sodium aluminate. Among these agents sulfuric acid is the cheapest.

The applications of activated silica depend mainly on the size, charge, and shape of the polymer. During the aging period the monomer, dimer, or low molecular weight polymer of silicic acid formed on neutralization of the silicate alkalinity by acidic material increases in size. The mixture gels if the aging process is not stopped by dilution, addition of alkali or other means. The size of the activated silica polymer can be varied over a wide range by controlling the aging time. The charge of the polymer may be varied by changing the pH or by forming the polymer in the presence of ions and molecules that are adsorbed. This changes the chemical/physical properties of the polymer.

In summary, prior methods of making activated silica called for:
 A close control of alkalinity, such as the Baylis method;
 The use of relatively expensive activating reagent, such as sulfate salts;
 The use of gases such as carbon dioxide, chlorine, and sulfur dioxide that can cause asphyxiation; or
 Relatively long aging time.
These prior methods had the following disadvantages:
 Requires close monitoring of the preparation process;
 Activated silica pH is above 7;
 Frequent maintenance due to failed or gelled silica;
 Close monitoring for gas (chlorine, carbon dioxide, sulfur dioxide) leaks;
 Long aging time; or
 Poor quality control in the manufacture of activated silica.

Thus, there is a need for a fast, safe, low cost, and efficient process for making a stable acidified activated silica solutions. My invention fills that need.

SUMMARY

The present invention shows a way of making a stable acidified activated silica for water treatment by neutralization and acidification of the alkali silicate using mineral acid and then stabilizing the activated silica in the presence of polyvalent metal salt of aluminum or iron.

Objects and Advantages

Accordingly, besides the objects and advantages in the preparation process for activated silica described in my above patent, several objects and advantages of the present invention are:
provides a fast and efficient preparation process;
provides a preparation process that is simpler and cheaper to operate than existing processes;
provides a preparation process that can be easily adapted to existing processes;
provides a preparation process free of the hazards associated with the use of asphyxiating gases;
provides a preparation process that can be tailored to different kinds of raw water;
provides a preparation process that can use commonly available acid; and
provides a preparation process that produce an acidified activated silica that is more active and stable.

The description and drawings below show additional objects and advantages.

PREFERRED EMBODIMENT

Figure 1:
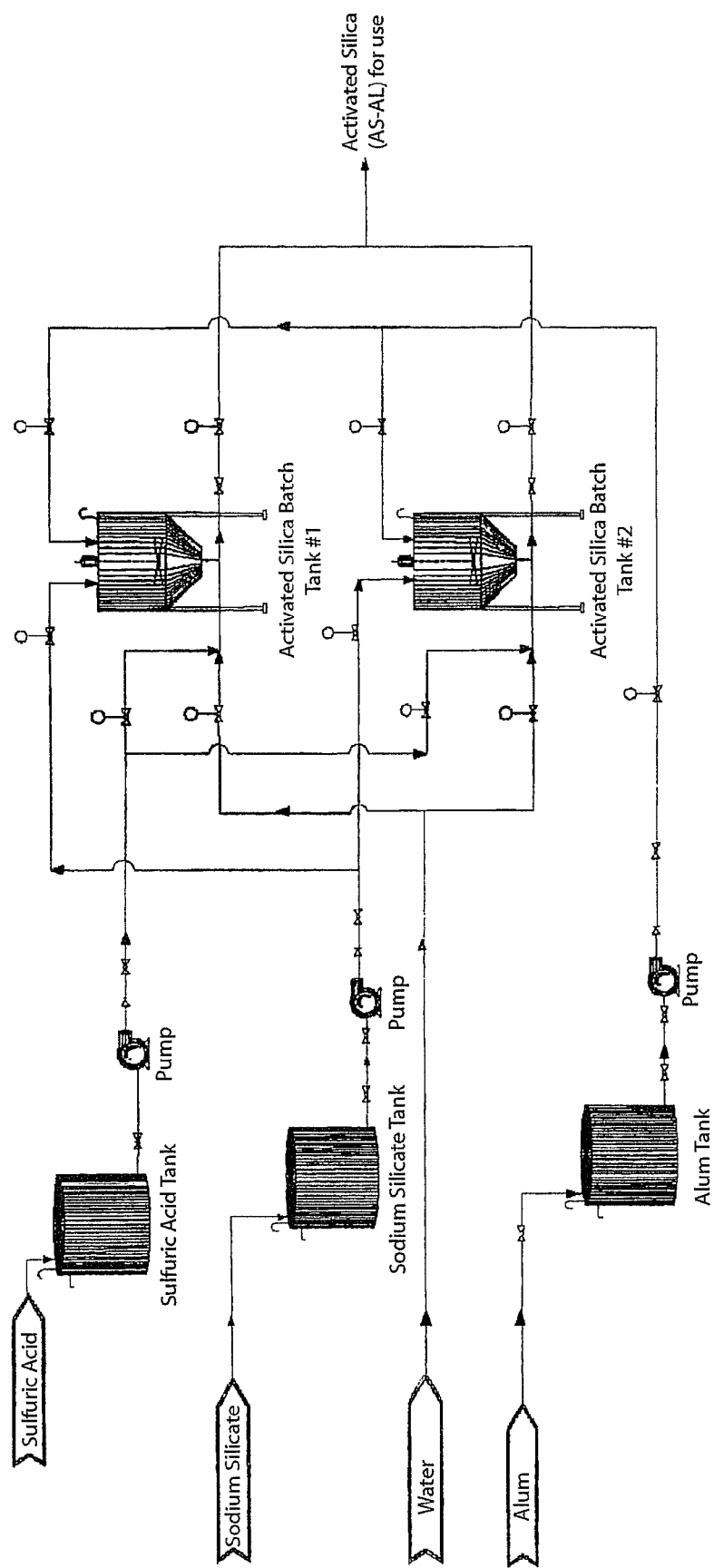
FIG. 1 shows the major components and flow directions of my activated silica preparation process.

A preferred process involving selected major operations is shown in FIG. 1.

AS-AL is produced and stored in two (2) batching/storage tanks, made of High Density Cross-Linked Polyethylene. The liquid level in each tank is monitored by ultrasonic level transmitter with the value read-out available locally at the transmitter and at the main SCADA computer. The tanks have an empty volume of five cubic meters and can hold a four cubic meter batch.

Activated Silica is generated in the batching tanks in accordance with the following sequence:

| Step No. | What To Do |
| --- | --- |
| 1 | Open water line and fill batching tank with water until total volume is 2 000 liters. |
| 2 | Add 100 liters of Sodium Silicate with mixer operating at full speed. |
| 3 | Open water supply line and add 11 liters of 93% sulfuric acid into water line while water is added to the tank. Continue water addition until total volume in the tank is 3 000 liters. Mixer is at high speed. The pH of the batch is about 7. |
| 4 | Pause (optional) for about 7 minutes for activated silica to form. This step allows different degrees of polymerization to take place. A longer pause favors the formation of higher molecular weight AS. |
| 5 | Open water supply line and add another 9 liters of 93% sulfuric acid into water line while water is added to the tank. Continue water addition until total volume in the tank is 4 000 liters. Mixer is at high speed. The pH of the batch should be about 1.5 to 2.5. |

-continued

| Step No. | What To Do |
| --- | --- |
| 6 | Add 50 liters of alum to the activated silica batch. Mixer at high speed. |
| 7 | Switch mixer speed from high to low. AS-AL batch is ready for use. |

The following is typical timeline for the batching process. Not included in the estimated time is the extra 5 minutes mixing time after each step to make sure the mixture is homogenous before proceeding to the next step.

Volume of ingredients added to the batch is measured using "Milltronics" liquid level sensor. Water, alum, and sodium silicate volumes are measured using the AS batch tank sensor, while the acid volume is measured using the acid "day" tank sensor.

| Step No. | Notes |
| --- | --- |
| 1 | Estimated time: 13 minutes at 150 L/min water addition rate. The water is added at the bottom of the tank and mixed with leftover activated silica from the previous batch. It is advisable to keep the volume of leftover activated silica to a minimum (<50 L). |
| 2 | Estimated time: 15 to 35 minutes. The time required to add 100 liters of sodium silicate, depends on pump capacity and viscosity of the silicate. The silicate is added through the top of the tank to prevent it from contacting acidic solution that will cause gelling. The silicate should be stored at all times above 23 degrees Centigrade to keep the silicate fluid enough to pump. After silicate addition, the batch pH is greater than 11 and $SiO_2$ concentration of about 2%. |
| 3 | Estimated time: 5 minutes The water supply is first opened and after 1 minute the concentrated acid is injected into the water line for dilution and mixing before it comes in contact with the silicate solution inside the batch tank. The agitator provides vigorous mixing of the acid and silicate solution. After acid addition the pH of the batch is about 7, $SiO_2$ concentration about 1.5%. Batch volume about 3 cubic meters. |
| 4 | A pause (optional) or aging time for the formation of activated silica at about pH 7. (7 minutes) |
| 5 | Estimated time: 5 minutes The water supply is first opened and after 1 minute the concentrated acid is injected into the water line for dilution and mixing before it comes in contact with the silicate solution inside the batch tank. The agitator provides vigorous mixing of the acid and AS solution. Add water until the total volume in the tank is 4 000 liters. $SiO_2$ concentration about 1%. After acid addition the pH of the batch is about 1.5 to 2.5. |
| 5 | Estimated time: 10 minutes. Like the silicate, the alum is added through the top of the tank. |
| 6 | Switch mixer from high to low speed. Batch is ready for use. |

It is possible to produce AS-AL in a continuous process as oppose to the batch process shown above. Possible steps for reagent addition are: water, then sodium silicate, acid to lower the pH to about 2 before the addition of alum. In my method, the polymerization process takes place in a short time period. The 1% activated silica solution is miscible with alum. The ratio of alum to activated silica or silicate will depend on the water to be treated.

Unlike the continuous preparation process, the batch process is more reliable because of redundancy of having two batch/storage tanks. The batch preparation process is automated via a Supervisory Control and Data Acquisition (SCADA) computer.

EXAMPLE 1

At the Kirkland Lake Water Treatment Plant, AS-AL is manufactured using the procedure above. The AS-AL is added in two locations, at the discharge pipe of the low-lift pumps, and after the alum rapid mixer. Natural Organic Matter (NOM) is relatively high in the source water, the removal of NOM as an initial part of the process stream provides many operational benefits while achieving much better water quality.

NOM reacts with chlorine and thereby controls the level of dosing required to achieve the desired chlorine residual. In the case of chlorine, most operators are seeking to achieve a residual chlorine level throughout the distribution system; NOM is the most significant factor in determining the rate of chlorine decay. The formation of disinfection by-products (DBPs) has been one of the bigger issues of concern relating to disinfection processes. NOM is the precursor material for the generation of DBPs.

The effectiveness of AS-AL in removing DBPs precursors is monitored at the water treatment plant using a HACH THM Plus Reagent Kit. The THM Plus method reacts with trihalogenated disinfection byproducts formed as the result of the disinfection of drinking water with chlorine in the presence of NOM. The concentration is reported as ug/L chloroform. These DBPs may be produced in the treatment plant and the distribution system as long as the water is in contact with free chlorine residual. The formation of the DBPs is influenced by chlorine contact time, chlorine dose and residual, temperature, pH, precursor concentration, and bromide concentration.

DBP Formation Potential (DBPFP) as defined here is the maximum amount of DBPs that a sample can produce after adding enough chlorine that will leave a residual of 1 to 2 mg/L at the end of a 24-hour incubation period inside a dark room at 20 degree Celsius.

AS-AL can be used in colored and turbid waters with the dose rate varied readily just as any other chemical material used in water treatment to achieve the desired removal. The NOM removal proceeds rapidly, and any subsequent treatment can be applied with much reduced impact from NOM. The impact of DBP formation is significant, as is the reduction in disinfectant demand. The decay of chlorine in the distribution system is substantially reduced such that it is easier to provide residuals at a lower, more stable level through a much more extensive distribution system than otherwise would be the case.

Raw water intake for this plant has a DBPFP of 375 mg/L. The amount of alum used, and chlorine residual at the plant discharge were held constant at about 35 mg/L and 1.0 mg/L respectively. Typical results achieved with AS-AL are shown in Table 1.

TABLE 1

|  | Without AS-AL | With AS-AL |
|---|---|---|
| DBPFP of Raw Water, ppb | 375 | 375 |
| DBPFP of Plant Treated Water, ppb | 256 | 126 |
| DBPs in Plant Treated Water, ppb | 133 | 55 |
| DBPs in Distribution System Water, ppb | 189 | 90 |
| Chlorine Consumption, mg/L | 2.6 | 1.5 |

Because the treated water exhibits lower chlorine demand, the chlorine residual in the distribution system is more stable and has lower standard deviation than the untreated sample as shown in Table 2.

TABLE 2

| Sampling Station Number | Without AS-AL (mg/L Free Chlorine) | With AS-AL (mg/L Free Chlorine) |
|---|---|---|
| Site 251 | 0.53 | 0.59 |
| Site 252 | 0.60 | 0.50 |
| Site 253 | 0.37 | 0.55 |
| Site 254 | 0.18 | 0.53 |
| Site 255 | 0.35 | 0.49 |
| Site 256 | 0.22 | 0.44 |

EXAMPLE 2

At the Swastika Sewage Treatment Plant near Kirkland Lake, Ontario, the AS-AL was used instead of the aluminum or iron salts added before the clarifier. AS-AL was put into a storage tank containing leftover precipitated ferric sulfate salts, in so doing, dissolving the iron salt into the AS-AL. Using the AS-AL solution resulted in improved plant effluent characteristics shown in Table 3.

TABLE 3

|  | Suspended Solids | Color |
|---|---|---|
| Without AS-AL | 15 | Yellowish |
| With AS-AL | 6 | Colorless |

Conclusions, Ramifications, and Scope

It is clear that AS-AL produced by my method enhances the removal of DBP precursors in raw water. My method of preparing AS-AL extends present knowledge in the manufacture of flocculants or coagulant aids. Furthermore, my method of manufacture and use has additional advantages over prior art in that:
  it allows the use of low cost and commonly available reagents;
  it allows the production of an acidified activated silica that is active and stable;
  it provides a fast preparation process;
  it provides low maintenance on equipment due to less precipitation or gelling of the activated silica; and
  it provides an effective means of removing impurities in water.

Figure 2:
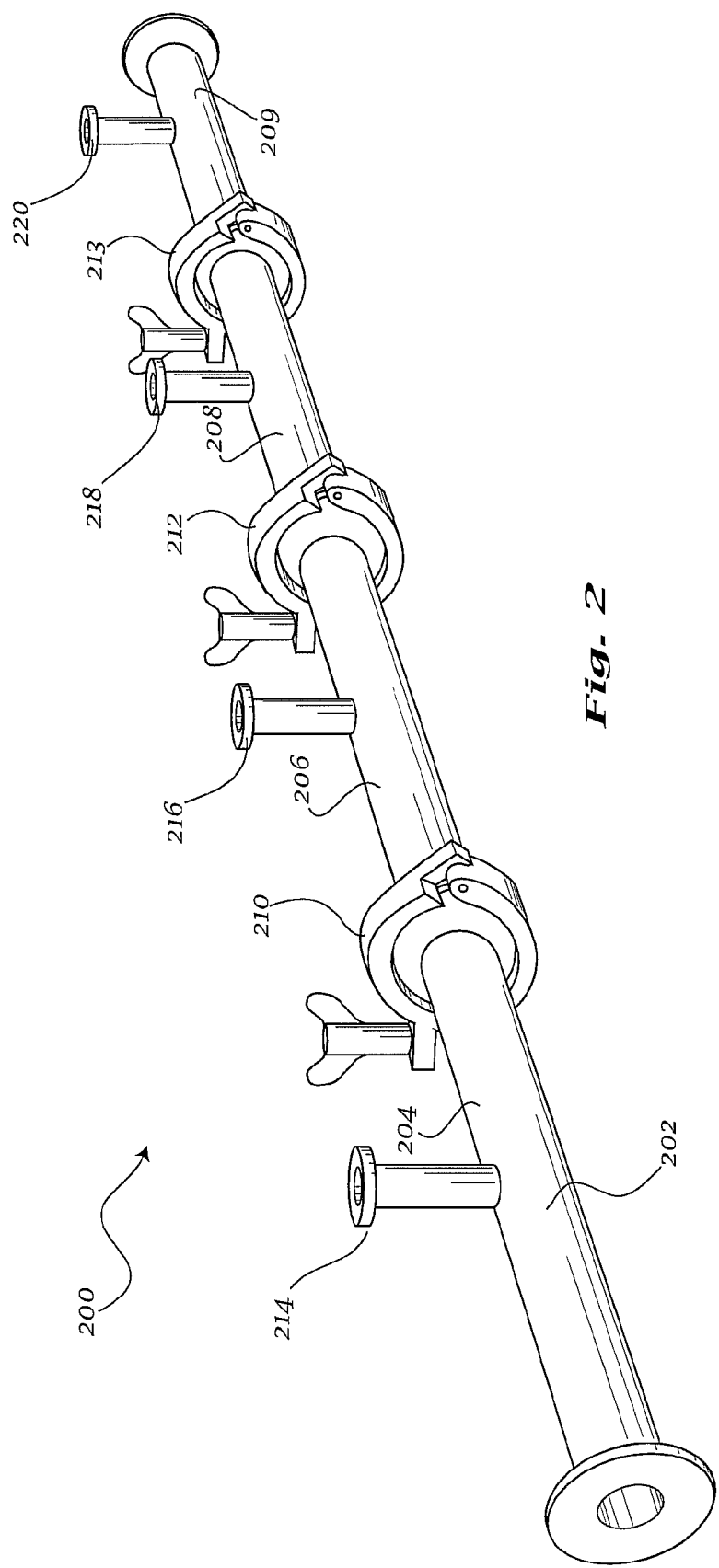
FIG. 2 shows an exemplary view of a static view.

As described previously, and as shown in exemplary FIG. 2, it is possible to produce AS-AL in a continuous process. If desired, the production of AS-AL in a continuous process can involve the use of a pipe, tank or a mixer, such as a static in-line mixer 200. A static in-line mixer may include a tank 202 and any number of compartments therein, for example compartments 204, 206, 208 and 209. Additionally, each compartment may be capable of or allow for the mixing of any components or ingredients without interaction with any components or ingredients of any other compartment. Compartments in mixer 200 may be separated by valves, such as valves or flanges 210, 212 and 213. Additionally, components or ingredients to be mixed may be inputted through inputs or ports 214, 216, 218 and 220, for example. Further, any number of flanges or ports may be utilized with mixer 200 so that any number of compartments may be formed and any number of ingredients may be added.

In one exemplary embodiment, a first compartment 204 of a mixer may contain a sodium silicate solution. The sodium silicate solution may be agitated or mixed in any desired fashion, for example through the use of a moving agitator or a through the flowing of the liquid solution against a fixed structure, generating turbulence (or static mixing). The solution in the first compartment may then be flowed into a second compartment 206. In the second compartment 206, a first acid may be added to the solution to decrease the pH of the solution to about 7. Again, the solution in the second compartment 206 may be agitated in any desired fashion. Then, the liquid in the second compartment 206 may be flowed into a third compartment 208. In the third compartment 208 a second acid may be added to the liquid, for example, to decrease the pH to about 4 or lower. Then in some further exemplary embodiments, the liquid in the third chamber may be flowed to a fourth compartment or chamber 209 where it may be stabilized in any desired manner, for example through dilution or the addition of a salt of aluminum, such as alum through port 220.

The specific data in the examples described above are merely illustrative; they do not limit the scope of the invention. Various ramifications are possible within the scope of the invention. For example, although the alum was used in this particular water treatment plant, other water treatment processes may use iron salts to improve the removal of metals such as arsenic in addition to the removal of NOM. The ratio of the polyvalent metal salt to activated silica can be varied to suit the water to be treated. The acidified activated silica may be used alone without the synergistic benefits of a polyvalent metal salt.

Thus, the scope of the invention should be determined by the appended claims and their legal equivalents, rather than by the examples given.

What is claimed is:

1. A method of making an acidic solution of activated silica in a continuous process, comprising:
    forming a solution out of a predetermined amount of water with a predetermined amount of an alkali silicate;
    forming activated silica in the solution through an addition of a predetermined amount of acid to the solution;
    forming an acidic solution of activated silica through a decrease of the pH of the solution to about 1.5 to about 2.5; and
    stabilizing the acidic solution of activated silica with a salt of aluminum after decreasing the pH, wherein said salt of aluminum is miscible in said acidic solution of activated silica, and the ratio of said salt of aluminum to said activated silica in said acidic solution is capable of removing natural organic matter from water.

2. The method of claim 1, further comprising mixing the predetermined amount of water and predetermined amount of the alkali silicate, forming the acidic solution of activated silica and stabilizing the acidic solution of activated silica with a static in-line mixer.

3. The method of claim 2, wherein the mixing of the predetermined amount of water with the predetermined amount of the alkali silicate is done in a first compartment of the static in-line mixer.

4. The method of claim 3, further comprising agitating the predetermined amount of water and the alkali silicate in the first compartment of the static in-line mixer.

5. The method of claim 2, wherein the forming of the acidic solution of activated silica is done in a second compartment of the static in-line mixer.

6. The method of claim 5, further comprising agitating the acidic solution in the second compartment of the static in-line mixer.

7. The method of claim 2, wherein the stabilizing of the acidic solution of activated silica is done in a third compartment of the static in-line mixer.

8. The method of claim 7, further comprising agitating the stabilized acidic solution of activated silica in the third compartment of the static in-line mixer.

9. The method of claim 1, further comprising decreasing the pH of the solution of the predetermined amount of water and the predetermined amount of the alkali silicate from about 7 to about 1.5.

* * * * *